United States Patent [19]

Müller et al.

[11] Patent Number: 5,777,163

[45] Date of Patent: Jul. 7, 1998

[54] PREPARATION OF HYDROXYLAMINES FROM AMMONIA OR THE CORRESPONDING AMINES, HYDROGEN AND OXYGEN

[75] Inventors: Ulrich Müller, Neustadt; Daniel Heineke, Ludwigshafen, both of Germany

[73] Assignee: BASF Aktiengesellschaft, Ludwigshafen, Germany

[21] Appl. No.: 809,709

[22] PCT Filed: Sep. 23, 1995

[86] PCT No.: PCT/EP95/03771

§ 371 Date: Apr. 4, 1997

§ 102(e) Date: Apr. 4, 1997

[87] PCT Pub. No.: WO96/10535

PCT Pub. Date: Apr. 11, 1996

[30] Foreign Application Priority Data

Oct. 4, 1994 [DE] Germany .................. 44 35 239.5

[51] Int. Cl.⁶ .................. C07C 239/00; C07C 239/08; C01B 21/14
[52] U.S. Cl. .................. 564/301; 423/387; 564/300
[58] Field of Search .................. 564/300, 301; 423/387

[56] References Cited

U.S. PATENT DOCUMENTS 3,960,954  6/1976  Russell et al. .................. 260/566 A

FOREIGN PATENT DOCUMENTS

| 0 325 053 | 7/1989 | European Pat. Off. . |
| 0 326 759 | 8/1989 | European Pat. Off. . |
| 0 469 662 | 2/1992 | European Pat. Off. . |
| 0522 634 | 1/1993 | European Pat. Off. . |
| 4425672.8 | 7/1994 | Germany . |

*Primary Examiner*—Peter O'Sullivan
*Attorney, Agent, or Firm*—Oblon, Spivak, McClelland, Maier, Neustadt, P.C.

[57] ABSTRACT

Hydroxylamines are prepared from ammonia or the corresponding amines, hydrogen and oxygen by a process in which the starting materials are reacted under heterogeneous catalysis using an oxidation catalyst based on a titanium or vanadium silicalite having a zeolite structure and containing from 0.01 to 20% by weight of one or more platinum metals selected from the group consisting of ruthenium, rhodium, palladium, osmium, iridium and platinum, the platinum metals each being present in at least two different bond energy states.

7 Claims, No Drawings

PREPARATION OF HYDROXYLAMINES FROM AMMONIA OR THE CORRESPONDING AMINES, HYDROGEN AND OXYGEN

This application is a 371 of PCT/EP95/03771 filed 23 Sep. 1995.

The present invention relates to an improved process for the preparation of hydroxylamines from ammonia or the corresponding amines, hydrogen and oxygen using a certain oxidation catalyst.

Multistage industrial processes are known for the preparation of hydroxylamine starting from ammonia. The disadvantage of these processes is that they bind the resulting hydroxylamine in the form of ammonium salts, which subsequently, for example when used in processes for the preparation of caprolactam, inevitably lead to considerable amounts of ammonium sulfate salts.

A salt-free process based on ammonia and hydrogen peroxide is described in EP-A 522 634, but the use of expensive hydrogen peroxide makes this process uneconomical.

It is an object of the present invention to provide an easily prepared and efficient oxidation catalyst for the preparation of hydroxylamines from ammonia or the corresponding amines and a corresponding process which no longer has the disadvantages of the prior art and is capable of producing hydroxylamines in salt-free form from ammonia or the corresponding amines, hydrogen and oxygen.

We have found that this object is achieved by a process for the preparation of hydroxylamines from ammonia or the corresponding amines, hydrogen and oxygen, wherein the starting materials are reacted under heterogeneous catalysis using an oxidation catalyst based on a titanium or vanadium silicalite having a zeolite structure and containing from 0.01 to 20% by weight of one or more platinum metals selected from the group consisting of ruthenium, rhodium, palladium, osmium, iridium and platinum, the platinum metals each being present in at least two different bond energy states.

Such oxidation catalysts are disclosed in German Patent Application P 44 25 672.8.

For the purpose of the present invention, it is of decisive importance that, before it is used, the oxidation catalyst contains the platinum metals in the stated special modification comprising the mixture of different bond energy states. The different bond energy states correspond formally to different oxidation states of the metals. In a preferred embodiment, two, three, four or five different bond energy states are present.

Where two different bond energy states are present, this may correspond, for example, to a mixture of species of oxidation states 0 and +1, 0 and +2, 0 and +3 or 0 and +4. The two species are usually present in a ratio of from 5:95 to 95:5, in particular from 10:90 to 90:10.

Where three different bond energy states are present, this corresponds, for example, to a mixture of species of oxidation states 0, +1 and +2 or 0, +2 and +3, or 0, +2 and +4 or 0, +1 and +3 or 0, +1 and +4 or 0, +3 and +4. The three species are usually present in a ratio of (0.05–20):(0.05–20):1, in particular (0.1–10):(0.1–10):1.

Mixtures of four or more different oxidation states may also be present, for example of 0, +1, +2 and +3 or 0, +1, +2 and +4, or 0, +2, +3 and +4 or 0, +1, +3 and +4 or 0, +1, +2, +3 and +4. Here, the species are present in weight ratios which are similar to those in the case of the mixtures of 2 or 3 different oxidation states.

Palladium is preferred among platinum metals. In a particularly preferred embodiment, the palladium is present in two or three different bond energy states.

The bond energy states at the surface of the catalyst can most easily be characterized by X-ray photoelectron spectroscopy (XPS). For example, in a typical mixture of three palladium species, the corresponding values for the energies of the $Pd\text{-}3d_{5/2}$ state is 335.0–335.4 eV, 336–336.6 eV and 337.1–337.9 eV, which formally corresponds to the oxidation states $Pd^0$, $Pd^{1+}$ and $Pd^{2+}$.

In the case of the oxidation catalysts described, it is particularly advantageous to apply the platinum metals in such a way that no metal-metal bonds are effective and metal-zeolite bonds predominate. In particular, X-ray fine structure investigations (EXAFS) reveal that, with the presence of palladium, an essential feature is that virtually exclusively palladium-oxygen bond distances of 2.02±0.02 Å occur and palladium-palladium distances of 2.74±0.02 Å, as in expanded palladium metal or palladium agglomerates, and palladium-palladium distances of 3.04±0.02 Å as in palladium(II) oxide are avoided.

The oxidation catalyst described is based on known titanium silicalites or vanadium silicalites having a zeolite structure, preferably having a pentasil zeolite structure, in particular the types which are classified as the MFI or MEL structure or MFI/MEL mixed structure by X-ray analysis. Zeolites of this type are described, for example, in W. M. Meier and D. H. Olson, Atlas of Zeolite Structure Types, Butterworths, 2nd Ed. 1987. Titanium-containing zeolites having the ZSM-48, ferrierite or β-zeolite structure are also possible.

In the oxidation catalyst described, some or all of the titanium of the silicalite may be replaced by vanadium. The molar ratio of titanium and/or vanadium to the sum of silicon plus titanium and/or vanadium is as a rule from 0.01:1 to 0.1:1.

The content of the stated platinum metals in the oxidation catalyst described is from 0.01 to 20, preferably from 0.1 to 10, in particular from 0.2 to 5, % by weight, based on the total weight of the oxidation catalyst.

Apart from being modified with the stated platinum metals, the oxidation catalyst described may additionally be modified with one or more elements selected from the group consisting of iron, cobalt, nickel, rhenium, silver and gold. These elements are then usually present in an amount of from 0.01 to 10, in particular from 0.05 to 5, % by weight, based on the total weight of the oxidation catalyst.

The oxidation catalyst described is advantageously prepared by impregnating or reacting the titanium or vanadium silicalite having the zeolite structure with salt solutions, chelate complexes or carbonyl complexes of the platinum metals, by a preparation method in which the required distribution of the bond energy states of the platinum metals is established after the impregnation or reaction by suitable reducing or oxidizing conditions.

Thus, the platinum metals may be applied, for example, by impregnation with a platinum metal salt solution, in particular in oxidation states +2 to +4, from pure aqueous, pure alcoholic or aqueous alcohol mixture at from 20° to 90° C., in particular from 30° to 55° C. The salts used may be, for example, the corresponding chlorides, acetates or tetramine complexes thereof, and palladium(II) chloride, palladium(II) acetate and the palladium(II)-tetraminechloro complex are to be mentioned here in the case of palladium. In this case the amount of the metal salts should be chosen so that concentrations of from 0.01 to 20% by weight of platinum metal are achieved on the resulting oxidation catalyst.

The reaction with corresponding chelate complexes of the platinum metals in nonpolar solvents, for example with acetylacetonates, acetonylacetonates or phosphine complexes, is also suitable here.

Application in the form of corresponding carbonyl complexes of the platinum metals is also possible. This is advantageously carried out in the gas phase under superatmospheric pressure or by impregnation with these carbonyl complexes in supercritical solvents, such as $CO_2$.

After the resulting catalyst intermediate has been subjected to any required drying and/or any required baking step, the distribution of the bond energy states is established preferably by partial reduction of existing high oxidation states of the platinum metals, in particular by hydrogenation in a hydrogen atmosphere. If the platinum metals are already present in the oxidation state 0, for example on application as carbonyl complexes, partial oxidation must be effected.

In a preferred embodiment, the oxidation catalyst described is impregnated with salt solutions of the platinum metals in the oxidation states +2 to +4, and the dried catalyst is then hydrogenated in a hydrogen atmosphere; in this preparation method, the hydrogenation is carried out at from 20° to 120° C., in particular from 25° to 100° C., preferably from 30° to 70° C.

If the temperature is chosen too high in this partial reduction by hydrogenation in a hydrogen atmosphere, the platinum metals are present virtually exclusively in the oxidation state 0, ie. as metals, and in the form of relatively large agglomerates, which is detectable in the micrograph from the occurrence of metal clusters having sizes greater than 1.0 nm.

The abovementioned titanium or vanadium silicalites having a zeolite structure, in particular those having the MFI pentasil zeolite structure, are generally prepared by crystallizing a synthetic gel, consisting of water, a titanium or vanadium source and silica in a suitable manner with the addition of organic nitrogen-containing compounds (template compounds) under hydrothermal conditions and, if required, with the addition of ammonia, an alkali or fluoride as mineralizers. Examples of suitable organic nitrogen-containing compounds are 1,6-diaminohexane or salts or the free hydroxide of tetraalkylammonium, especially of tetrapropylammonium.

In the preparation of the titanium or vanadium silicalites, contamination with relatively large amounts of alkali metal or alkaline earth metal compounds must be avoided; alkali metal contents (in particular sodium or potassium contents) of <100 ppm are desirable in order subsequently to obtain a sufficiently active oxidation catalyst.

The crystallization of the single-phase structure of the titanium or vanadium silicalite is effected preferably at from 140° to 190° C., in particular from 160° to 180° C., in the course of from 2 to 7 days, a product having good crystallinity being obtained after only about 4 days. The duration of the synthesis on the one hand and the crystallite size on the other hand can be substantially reduced by vigorous stirring and a high pH of from 12 to 14 during the crystallization.

For example, primary crystallites of from 0.05 to 0.5 µm, in particular those having a mean particle diameter of less than 0.2 µm, are advantageous.

After the crystallization, the titanium or vanadium silicalite can be filtered off by a method known per se, washed and dried at from 100° to 120° C.

In order to remove the amine or tetraalkylammonium compounds still present in the pores, the material may furthermore be subjected to a thermal treatment in air or under nitrogen. In this procedure, it is advantageous to burn off the template under conditions which limit the temperature increase to <550° C.

In addition to the abovementioned additions of platinum metals and other elements, the prior art methods for shaping with the aid of a binder, ionic exchange or surface modification for example by chemical vapor deposition (CVD) or chemical derivatization, for example silylation, may be used for modifying the oxidation catalyst described.

The presence of the catalyst functions required for an oxidation reaction may be tested by IR spectroscopy: significant bands occur at 550 $cm^{-1}$ and at 960 $cm^{-1}$ and indicate the presence of the desired crystallinity and of the required oxidation activity.

The oxidation catalyst described can also be regenerated in a simple manner. Deactivated catalysts can be converted back into an active form by controlled burning off and subsequent reduction with, for example, hydrogen.

If the coating is small, the catalyst can also be regenerated by a simple wash process. Depending on requirements, the wash process can be carried out at neutral, acidic or basic pH. If necessary, the catalyst activity can also be regenerated by means of a solution of hydrogen peroxide in a mineral acid.

The oxidation catalyst described is particularly suitable for the preparation of unsubstituted hydroxylamine as well as for the preparation of substituted hydroxylamines from the corresponding amines, hydrogen and oxygen, for example from cyclic or aliphatic amines, such as cyclohexylamine, which can undergo partial further reaction to the corresponding lactams under the reaction conditions.

The novel reaction can be carried out in the liquid phase, in the gas phase or in the supercritical phase. In the case of liquids, the catalyst is preferably used as a suspension, while a fixed-bed arrangement is advantageous in the gas-phase or supercritical procedure.

If hydroxylamines are prepared in the liquid phase, the process is advantageously carried out at from 1 to 100 bar and by a suspension procedure in the presence of solvents. Suitable solvents are alcohols, eg. methanol, ethanol, isopropanol or tert-butanol, or mixtures thereof, and in particular water. Mixtures of the stated alcohols with water may also be used. In certain cases, the use of water or water-containing solvent systems results in a substantial increase in the selectivity of the desired epoxide compared with the pure alcohols as solvents.

The novel reaction is carried out as a rule at from -5° to 70° C., in particular from 20° to 50° C. The molar ratio of hydrogen to oxygen ($H_2:O_2$) can usually be varied in the range from 1:10 to 1:1 and is particularly advantageously from 1:2.5 to 1:1. The molar ratio of oxygen to ammonia is as a rule from 1:1 to 1:3, preferably from 1:1.5 to 1:1.7. The carrier gas introduced may be any inert gas, nitrogen being particularly suitable.

The examples which follow are intended to describe the invention in more detail without restricting it.

EXAMPLE 1

This example describes the crystallization of a titanium silicalite.

For this purpose, 455 g of tetraethyl orthosilicate were initially taken in a 2 l four-necked flask and 15 g of tetraisopropyl orthotitanate were added in the course of 30 minutes from a dropping funnel while stirring (250 rpm, paddle stirrer). A colorless, clear mixture formed. Finally, 800 g of a 20% strength by weight aqueous tetrapropylammonium hydroxide solution (alkali metal content <10 ppm)

were added and stirring was continued for a further hour. The alcohol mixture (about 450 g) formed by hydrolysis was distilled off at from 90° to 100° C. The mixture was made up with 1.5 l of demineralized water, and the now slightly opaque sol was transferred to a stirred 2.5 l autoclave. The closed autoclave (anchor stirrer, 200 rpm) was brought to a reaction temperature of 175° C. at a heating rate of 3° C./min. The reaction was complete after 92 hours. The cooled reaction mixture (white suspension) was centrifuged and the resulting solid was washed neutral several times with water. The solid obtained was dried at 110° C. in the course of 24 hours (weight obtained 149 g). Finally, the template still present in the zeolite was burnt off under air at 500° C. in the course of 5 hours (loss on calcination: 14% by weight).

The pure white product had a titanium content of 1.5% by weight and a residual alkali metal content (potassium) of 0.01% by weight, according to wet chemical analysis. The yield (based on $SiO_2$ used) was 97%. The crystallite size was about 0.1–0.15 μm and the product showed bands at 960 $cm^{-1}$ and 550 $cm^{-1}$, which are typical for the IR spectrum.

EXAMPLE 2

For impregnation with palladium, a flesh-colored solution was first prepared using 0.515 g of palladium(II) chloride and 120 g of ammonia solution (25% by weight in water) while stirring at room temperature. 60 g of the freshly prepared titanium silicalite from Example 1 were suspended in 130 g of demineralized water in a round-bottomed flask. The total amount of the prepared palladium-tetraminechloro complex solution was added to this, and the mixture was stirred for one hour in a rotary evaporator at room temperature under atmospheric pressure. Finally, the suspension was evaporated down under reduced pressure (5 mbar) at 90°–100° C. The white product was used directly for the reduction.

In a laboratory rotary tubular furnace (quartz glass, diameter 5 cm, length of heating zone 20 cm), 20 g of the Pd-impregnated product were reduced in the course of 90 minutes at 50° C. with a gas mixture comprising 20 l/h of nitrogen and 1 l/h of hydrogen at a rotational speed of the furnace of 50 rpm.

The finished product had a pale color and had no metallic palladium clusters larger than 1.0 nm according to analysis under the transmission electron microscope (TEM). The palladium content was determined at 0.49% by weight by a wet chemical method. The three abovementioned bond energy states of the $Pd-3d_{5/2}$ photoelectron (formally corresponding to the oxidation states +2, +1 and 0) were found by means of XPS.

EXAFS measurements on this sample gave a signal for Pd-O or Pd-N bond distances of 2.02±0.02 Å. Pd-Pd bond distances of 2.74±0.02 Å or 3.04±0.02 Å were not observed.

EXAMPLE 3

This example illustrates the one-stage preparation of hydroxylamine from ammonia, hydrogen and oxygen over the catalyst prepared according to Examples 1 and 2, in aqueous solution.

2 g of catalyst (Example 2) were initially taken with 150 ml of distilled water and 2.4 g of ammonia solution (25% by weight in water) in a pressure-resistant steel reactor (volume 0.375 l). 20 bar oxygen and 20 bar hydrogen were then introduced into the closed reactor.

The stirred suspension was reacted at 30° C. for 1 hour, then cooled and freed from excess hydrogen/oxygen mixture by introducing in nitrogen and letting down the pressure, these steps being carried out three times.

Hydroxylamine formed was determined by titration and derivatization. The yield was 11%, based on the ammonia used.

EXAMPLE 4

This example illustrates the requirement for the presence of noble metals on the novel catalyst.

The experiment in Example 3 was repeated with 2 g of catalyst from Example 1.

No hydroxylamine was found in the discharged mixture.

EXAMPLE 5

This example illustrates the requirement for the use of hydrogen in order to be able to react ammonia with oxygen to give hydroxylamine.

The experiment in Example 3 was repeated with the catalyst from Example 2, but the procedure was carried out without the addition of hydrogen.

No hydroxylamine was observed in the discharged mixture.

We claim:

1. A process for preparing a hydroxylamine, comprising:
reacting ammonia or an amine with hydrogen and oxygen under heterogenous catalysis in the presence of an oxidation catalyst comprising titanium silicalite or vanadium silicalite having a zeolite structure and 0.01 to 20% by weight of one or more platinum metals selected from the group consisting of ruthenium, rhodium, palladium, osmium, iridium and platinum, wherein each pialinum metal is present in at least two different bond energy states.

2. A process as claimed in claim 1, wherein the oxidation catalyst comprises from 0.01 to 20% by weight of palladium, wherein the palladium is present in two or three different bond energy states.

3. A process as claimed in claim 1, wherein the oxidation catalyst further comprises one or more elements selected from the group consisting of iron, cobalt, nickel, rhenium, silver and gold.

4. A process as claimed in claim 1, wherein the oxidation catalyst has a molar ratio of titanium or vanadium to the sum of silicon plus titanium or vanadium of from 0.01:1 to 0.1:1.

5. A process as claimed in claim 1, wherein the oxidation catalyst is prepared by a process comprising impregnating or reacting a titanium silicalite or vanadium silicalite having a zeolite structure with salt solutions, chelate complexes or carbonyl complexes of the platinum metals followed by establishing the required distribution of the bond energy states of the platinum metals by suitable reducing or oxidizing conditions.

6. A process as claimed in claim 5, wherein the oxidation catalyst used is prepared by a process comprising impregnating the titanium silicalite or vanadium silicalite with salt solutions of the platinum metals in the oxidation states +2 to +4 and subsequently hydrogenating the dried catalyst in a hydrogen atmosphere at from 20° to 120° C.

7. A process as claimed in claim 1, wherein the reaction is carried out in the presence of water.

* * * * *